United States Patent
Fujii

(10) Patent No.: US 9,606,653 B2
(45) Date of Patent: Mar. 28, 2017

(54) INFORMATION PROCESSING APPARATUS

(71) Applicant: NEC CASIO Mobile Communications, Ltd., Kanagawa (JP)

(72) Inventor: Satoru Fujii, Kanagawa (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 14/377,978

(22) PCT Filed: Nov. 28, 2012

(86) PCT No.: PCT/JP2012/080728
§ 371 (c)(1),
(2) Date: Aug. 11, 2014

(87) PCT Pub. No.: WO2013/121649
PCT Pub. Date: Aug. 22, 2013

(65) Prior Publication Data
US 2015/0035773 A1    Feb. 5, 2015

(30) Foreign Application Priority Data

Feb. 14, 2012  (JP) .................................. 2012-029441

(51) Int. Cl.
*G06F 3/041*   (2006.01)
*G06F 3/0488*  (2013.01)
(Continued)

(52) U.S. Cl.
CPC ............ *G06F 3/041* (2013.01); *G06F 3/0412* (2013.01); *G06F 3/04886* (2013.01);
(Continued)

(58) Field of Classification Search
CPC ...... G06F 3/023; G06F 3/03545; G06F 3/041; G06F 3/0412; G06F 3/04886; G06F 2201/81; G06F 2203/04808; H03M 11/04
See application file for complete search history.

(56) References Cited

U.S. PATENT DOCUMENTS 5,973,676 A * 10/1999 Kawakura ........... G06F 3/04847
                                                         345/173
6,104,334 A *  8/2000 Allport ................. G06F 1/1626
                                                         340/12.28
(Continued)

FOREIGN PATENT DOCUMENTS

JP    05-080939    4/1993
JP    08-221201    8/1996
(Continued)

OTHER PUBLICATIONS

Extended European search report, dated Sep. 1, 2015; Application No. 12868706.8.
(Continued)

*Primary Examiner* — Michael J Eurice
(74) *Attorney, Agent, or Firm* — Young & Thompson

(57) ABSTRACT

Detection section (110) detects a touch on information processing apparatus (100). Control section (120) performs control based on the touch detected by detection section (110) and ignores the result detected by detection section (110) according to a period of time during which the touch position detected by detection section (110) has not moved.

4 Claims, 10 Drawing Sheets

(51) Int. Cl.
  *G06F 3/023* (2006.01)
  *G06F 3/0354* (2013.01)
(52) U.S. Cl.
  CPC .......... *G06F 3/023* (2013.01); *G06F 3/03545* (2013.01); *G06F 2201/81* (2013.01); *G06F 2203/04808* (2013.01)

(56) References Cited

U.S. PATENT DOCUMENTS

| | | | |
|---|---|---|---|
| 6,323,846 B1 | 11/2001 | Westerman et al. | |
| 2002/0149561 A1* | 10/2002 | Fukumoto | G01C 21/3664 345/156 |
| 2003/0063073 A1* | 4/2003 | Geaghan | G06F 3/0416 345/173 |
| 2006/0092142 A1* | 5/2006 | Gillespie | G06F 3/03547 345/173 |
| 2006/0279548 A1* | 12/2006 | Geaghan | G06F 3/0416 345/173 |
| 2007/0268273 A1* | 11/2007 | Westerman | G06F 3/0235 345/173 |
| 2008/0136662 A1* | 6/2008 | Bellows | G06K 7/0008 340/429 |
| 2008/0246740 A1* | 10/2008 | Nakamura | G06F 3/0412 345/173 |
| 2011/0080364 A1 | 4/2011 | Ording | |
| 2011/0095986 A1* | 4/2011 | Aono | G06F 3/0233 345/168 |
| 2011/0221685 A1* | 9/2011 | Lee | G06F 3/0482 345/173 |
| 2012/0280927 A1* | 11/2012 | Ludwig | G06F 3/041 345/173 |
| 2013/0293490 A1* | 11/2013 | Ward | G06F 3/0488 345/173 |
| 2014/0007006 A1* | 1/2014 | Pallakoff | G06F 3/04886 715/808 |

FOREIGN PATENT DOCUMENTS

| | | |
|---|---|---|
| JP | 11-045141 | 2/1999 |
| JP | 2002-091649 | 3/2002 |
| JP | 2004-206681 | 7/2004 |
| JP | 2005-050265 | 2/2005 |
| JP | 2007-184006 | 7/2007 |
| JP | 2009-163500 | 7/2009 |
| JP | 2010-238078 | 10/2010 |
| JP | 2011-048848 | 3/2011 |
| JP | 2011-086194 | 4/2011 |

OTHER PUBLICATIONS

International Search Report, PCT/JP2012/080728, Mar. 5, 2013.
Japanese Official Action—2014-50046—Jun. 21, 2016.
Extended European Search Report (EESR), dated Aug. 9, 2016, Application No. 12868706.8-1507.

* cited by examiner

INFORMATION PROCESSING APPARATUS

TECHNICAL FIELD

The present invention relates to an information processing apparatus that processes information, an information processing method therefor, and a program therefor.

BACKGROUND ART

In recent years, touch panel mobile terminals have been used and many such mobile terminals have an approximately 4-inch touch panel display mounted thereon.

When a software keyboard for character input is displayed on a touch panel of such a size, the detection area of a single key is generally smaller than that of a human finger. Therefore, particularly when an attempt is made to quickly input information, it is not easy to input information by accurately touching a finger on such a small area. In addition, when an attempt is made to release the finger from the touch panel, the finger may slide on the touch panel, thus moving the touch position. If that happens, information corresponding to a key displayed on a position adjacent to the position touched by the finger will be inputted.

To resolve this, there is considered a technique of performing a process according to the touch when the time during which the touch continues to be detected reaches a predetermined time (for example, see Patent Literature 1).

CITATION LIST

Patent Literature

Patent Literature 1: JP08-221201A

SUMMARY OF INVENTION

Technical Problem

However, the technique disclosed in Patent Literature 1 has a problem of requiring that the touch time be equal to or greater than a predetermined time even if a touch is made from a state in which a touch is not made, thereby preventing information from being inputted in an accurate and quick manner.

An object of the invention of this application is to provide an information processing apparatus, an information processing method, and a program that solve the above problem.

Solution to Problem

The information processing apparatus includes:
a detection section that detects a touch; and
a control section that performs control based on the touch detected by the detection section and ignores a result detected by the detection section according to a period of time during which a touch position detected by the detection section has not moved.

In addition, the information processing method performs:
a process of detecting a touch;
a process of performing control based on the detected touch; and
a process of ignoring the detected result according to a period of time during which the detected touch position has not moved.

Further, the program is a program for causing a computer to execute:
a procedure for detecting a touch;
a procedure for performing control based on the detected touch; and
a procedure for ignoring the detected result according to a period of time during which the detected touch position has not moved.

Advantageous Effects of Invention

As described above, information can be inputted in an accurate and quick manner.

DESCRIPTION OF EMBODIMENTS

Hereinafter, exemplary embodiments will be described with reference to the accompanying drawings.

Figure 1:
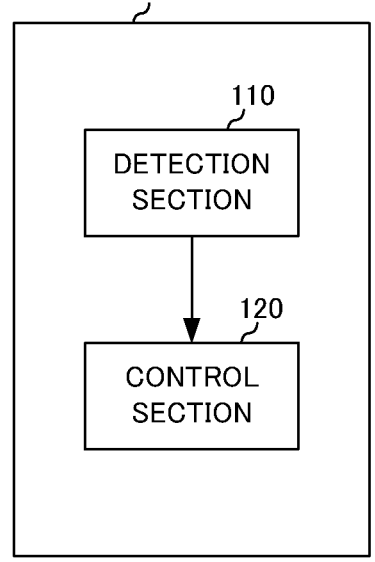
FIG. 1
A diagram showing one exemplary embodiment of an information processing apparatus of the present invention.

FIG. 1 is a diagram showing one exemplary embodiment of an information processing apparatus of the present invention.

As shown in FIG. 1, information processing apparatus 100 of the present exemplary embodiment includes detection section 110 and control section 120.

Examples of detection section 110 include a touch sensor. Detection section 110 detects the touch of an object such as a finger or a pen (such as a stylus pen) when it is placed on a predetermined portion of information processing apparatus 100.

Control section 120 performs control based on the touch detected by detection section 110. When detection section 110 detects a touch, control section 120 measures the time during which the detected touch position has not changed, namely, the time during which the detected touch position has not moved, and according to this measured time, ignores the subsequent result detected by detection section 110 (does not perform control based on the detected, subsequent result). At this time, based on the time during which the touch position has not moved, control section 120 calculates the time during which the result detected by detection section 110 is ignored, and ignores the result detected by detection section 110 for the calculated time.

Here, the touch detected by detection section 110 may be any touch including a touch on a touch panel or a touch pad as long as the touch can be processed by detecting the touch and according to the touch.

The following description will use an example in which detection section 110 detects a touch on a display including a touch panel function.

Figure 2:
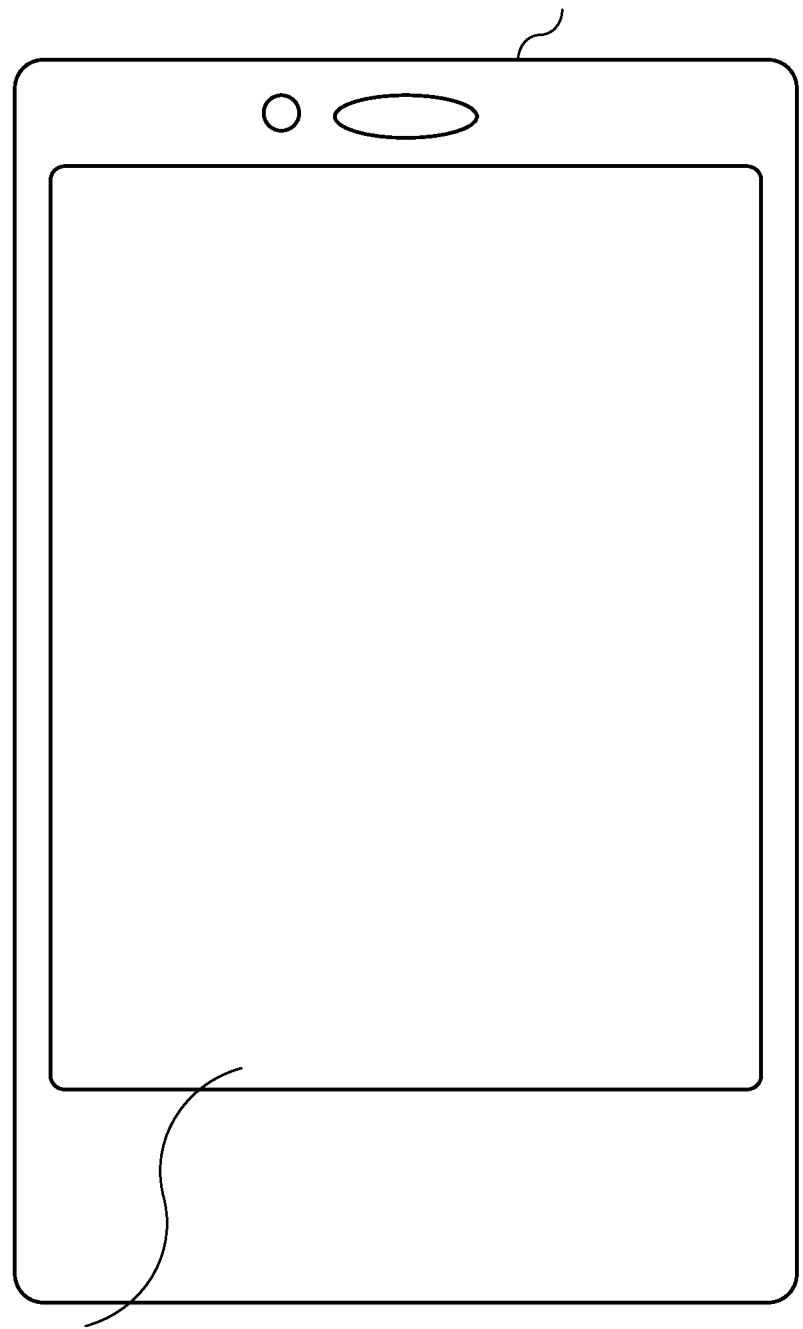
FIG. 2
An example of an external view of the information processing apparatus shown in FIG. 1, the information processing apparatus having a display including a touch panel function mounted thereon.

FIG. 2 is an example of an external view of information processing apparatus 100 shown in FIG. 1. Information processing apparatus 100 has a display including a touch panel function mounted thereon.

As shown in FIG. 2, information processing apparatus 100 includes display section (display) 130 that displays information. Display section 130 implements the touch panel function by cooperating with detection section 110.

Figure 3:
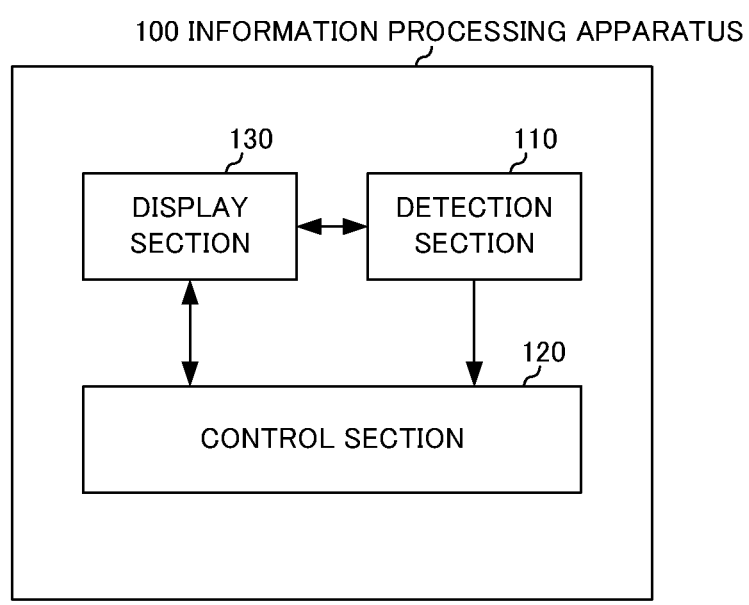
FIG. 3
A diagram showing one example of an internal configuration of the information processing apparatus shown in FIG. 2.

FIG. 3 is a diagram showing one example of an internal configuration of information processing apparatus 100 shown in FIG. 2.

As shown in FIG. 3, information processing apparatus 100 shown in FIG. 2 includes detection section 110, control section 120, and display section 130.

Display section 130 is a display that displays information.

Detection section 110 detects the touch of an object on the display surface of display section 130.

Control section 120 controls display of information on display section 130. In addition, control section 120 performs control based on the information displayed on the touch position detected by detection section 110.

Figure 4:
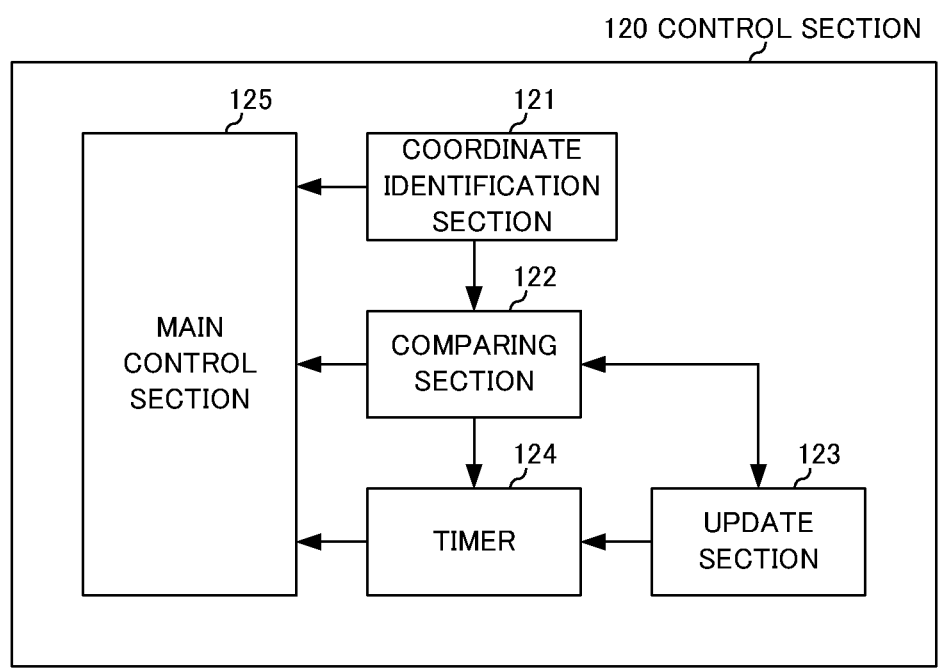
FIG. 4
A diagram showing one example of an internal detail of the control section shown in FIG. 3.

FIG. 4 is a diagram showing one example of an internal detail of control section 120 shown in FIG. 3.

As shown in FIG. 4, control section 120 shown in FIG. 3 includes coordinate identification section 121, comparing section 122, updating section 123, timer 124, and main control section 125.

Coordinate identification section 121 identifies a position (coordinate) on display section 130 where detection section 110 detects a touch. This identification method may be a general method.

Comparing section 122 compares a coordinate (first coordinate) identified by coordinate identification section 121 with a subsequent coordinate (second coordinate) identified by coordinate identification section 121 after detection section 110 detects a touch. Then, based on the compared results, comparing section 122 determines whether or not the first coordinate is the same as the second coordinate. If the first coordinate is the same as the second coordinate, comparing section 122 instructs updating section 123 to update the time (ignoring time) during which control section 120 ignores the results detected by detection section 110.

Meanwhile, if the first coordinate is different from the second coordinate, comparing section 122 instructs timer 124 to activate a timer and notifies main control section 125 of the effect.

When update of an ignoring time is instructed from comparing section 122, updating section 123 updates the ignoring time. This update method will be described later. In addition, updating section 123 notifies timer 124 of the updated time.

When coordinate identification section 121 identifies the coordinate, timer 124 is activated and measures the time during which the first coordinate is the same as the second coordinate. In response to a timer activation instruction from comparing section 122, timer 124 is activated, and when the time received from updating section 123 elapses, timer 124 notifies main control section 125 of the effect.

Main control section 125 ignores the results detected by detection section 110 during the period from the time when the timer activation instruction is received from comparing section 122 to the time when the notice is received from timer 124. During the period other than the above period, main control section 125 performs control based on the information displayed on the coordinate identified by coordinate identification section 121.

Hereinafter, the information processing method for information processing apparatus 100 shown in FIG. 3 will be described.

Figure 5:
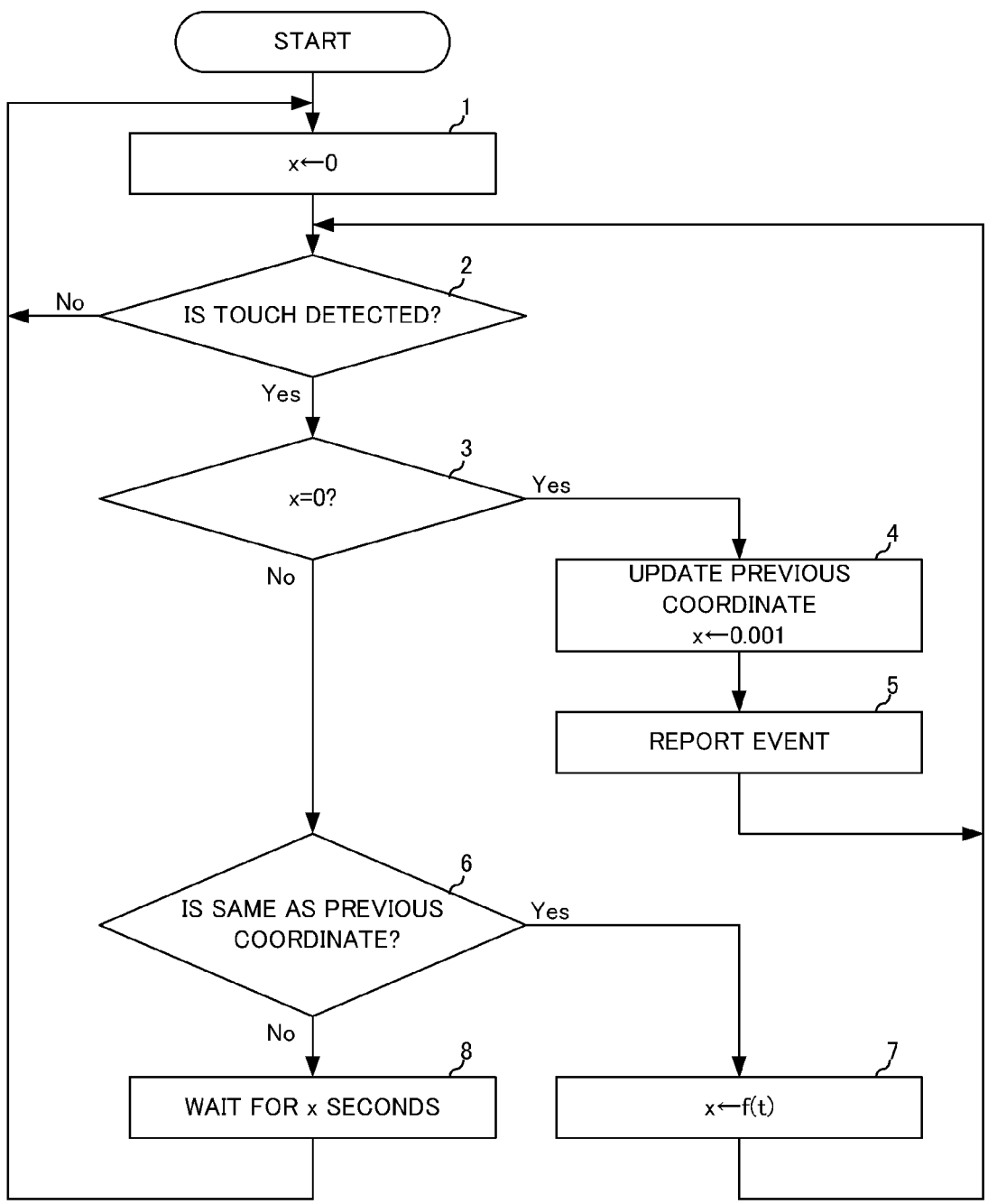
FIG. 5
A flowchart for explaining the information processing method for the information processing apparatus shown in FIG. 3.

FIG. 5 is a flowchart for explaining the information processing method for information processing apparatus 100 shown in FIG. 3.

First, in step 1, updating section 123 sets ignoring time "x" to an initial value of "0" and holds the value.

Then, in step 2, when detection section 110 detects a touch, coordinate identification section 121 identifies a coordinate on which the touch has been detected and outputs the coordinate to comparing section 122. At this time, timer 124 is activated and starts to measure the elapsed time.

Then, in step 3, comparing section 122 determines whether or not the ignoring time held by updating section 123 is "0". At this stage, namely, at first, the ignoring time is "0", and thus the process moves to step 4, in which comparing section 122 holds (records) the coordinate output from coordinate identification section 121, and updating section 123 updates the ignoring time "x" to a very small value greater than 0 (e.g., "0.001 (s)"). Then, in step 5, comparing section 122 notifies main control section 125 of an event indicating that the coordinate has been recorded.

Subsequently, when detection section 110 again detects a touch, the ignoring time "x" held by updating section 123 is not "0", and thus the process moves to step 6, in which comparing section 122 compares a previous first coordinate held (recorded) by comparing section 122 with a current second coordinate identified by coordinate identification section 121 after detection section 110 has detected the touch.

Based on the compared results, if the first coordinate is the same as the second coordinate, namely, if the touch position detected by detection section 110 has not moved, comparing section 122 instructs updating section 123 to update the ignoring time. In step 7, when update of the ignoring time is instructed, updating section 123 updates the current ignoring time using a predetermined expression. At this time, elapsed time (t) measured by timer 124 is used as a variable to be assigned to the expression.

Note that the longer the elapsed time (the time during which the touch position detected by detection section 110 has not changed), the longer is the ignoring time. Thus, the expression as used herein may be an expression where a second order differential value of the expression for calculating the ignoring time based on the elapsed time is always positive. For example, the expression may use a cosine function as used in (Expression 1) or may use a quadratic function.

[Expression 1]

$$x = a\left\{1 - \cos\left(\frac{t}{T} \cdot \frac{\pi}{2}\right)\right\} \quad \text{(Expression 1)}$$

In (Expression 1), "a" denotes a coefficient and "T" denotes a constant. In (Expression 1), "t" is defined for 0≤t≤T. In the case of T<t, the value is assumed to be x=a×T. For example, assuming that a=200 (ms), T=400 (ms), and elapsed time (t) is 400 (ms), the value is calculated as x=200 (ms). If elapsed time (t) is reduced from 400 (ms) to 200 (ms), ignoring time (x) is accordingly less than 200 (ms). Note that the values of "a" and "T" may be appropriately determined by experiment or the like, for example, in such a manner that the value of the ignoring time may be an appropriate value so as to prevent false detection and prevent an adverse effect on input processing.

As described above, as the function for calculating the ignoring time, the use of not a linear function but a non-linear function such as a cosine function whose differential coefficient is small at first and then increases with time can reduce the effect on continuous changes such as drawing a curve.

Meanwhile, if the first coordinate is not the same as the second coordinate, namely, if the touch position detected by detection section 110 is moved, timer 124 is activated with "0", timer 124 waits for "x" seconds in step 8, namely, during the period from the time when timer 124 is activated to the time when the ignoring time updated in step 7 by updating section 123 has elapsed, and main control section 125 ignores the touch results detected by detection section 110. Subsequently, updating section 123 sets ignoring time "x" to an initial value of "0" and holds the value.

Meanwhile, even if a finger or the like is released from a display surface of display section 130 and thus detection section 110 cannot detect a touch in step S2, updating section 123 also sets ignoring time "x" to an initial value of "0" and holds the value.

Figure 6:
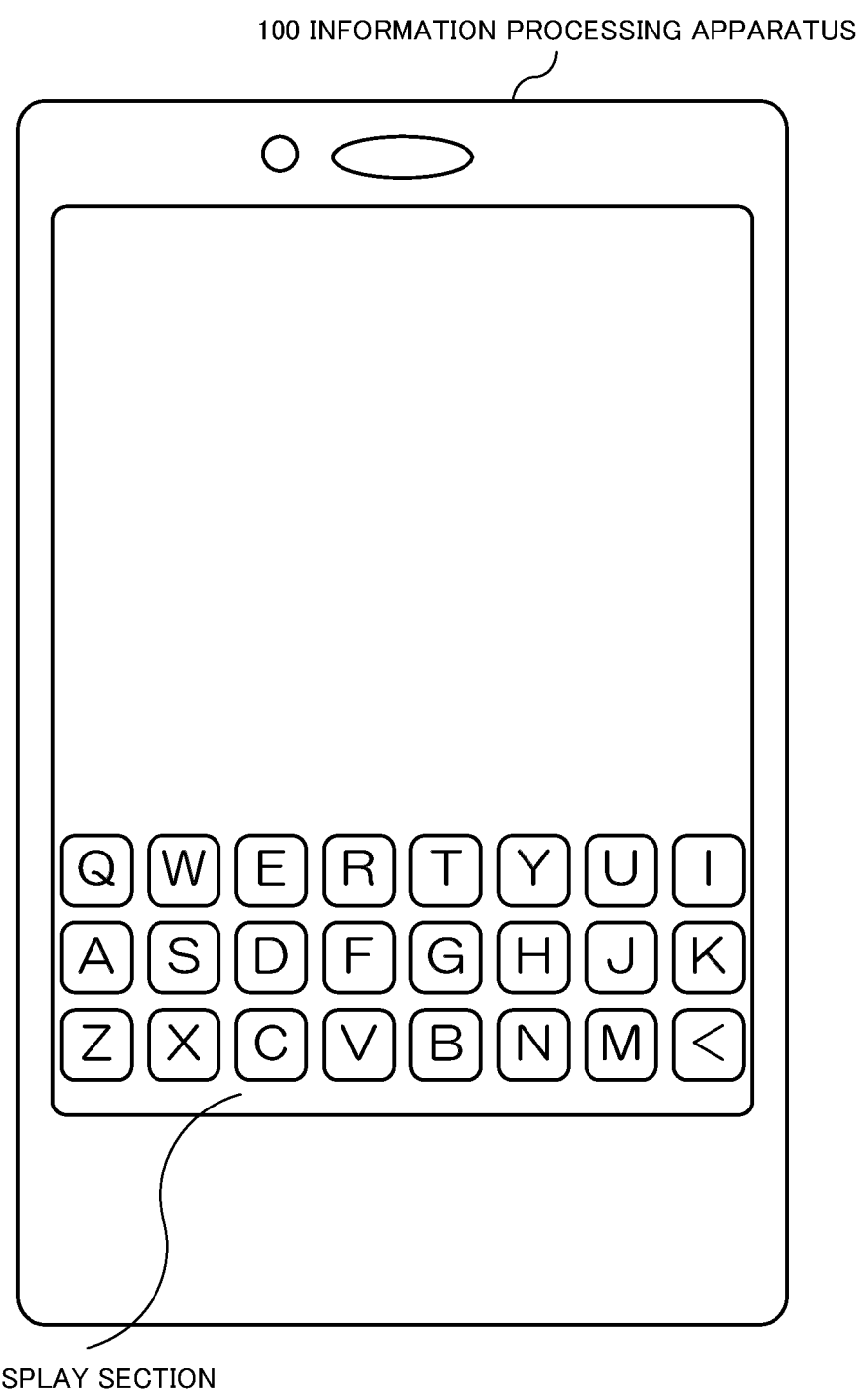
FIG. 6
A diagram showing one example of a state in which a software keyboard is displayed on the display section shown in FIG. 4.

FIG. 6 is a diagram showing one example of a state in which a software keyboard is displayed on display section 130 shown in FIG. 4.

As shown in FIG. 6, when a predetermined application is activated, or when a predetermined operation is performed, a software keyboard will be displayed on display section 130. As described above, the detection area of each key on the software keyboard is smaller than that of a human finger.

Figure 7:
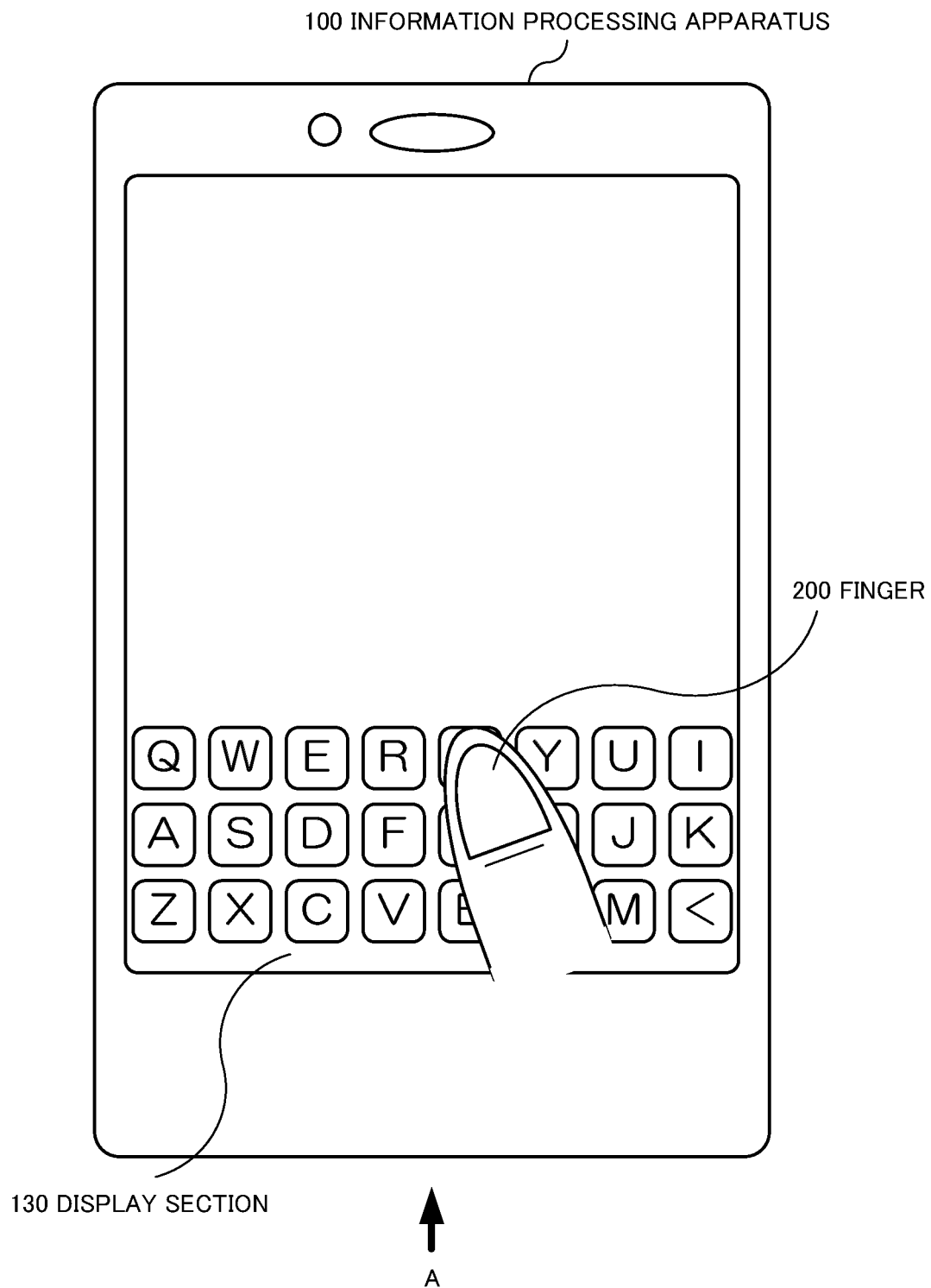
FIG. 7
A diagram showing one example of a state in which a finger touches a display region of a "T" key on the software keyboard displayed on the display section as shown in FIG. 6.

FIG. 7 is a diagram showing one example of a state in which a finger touches a display region of a "T" key on the software keyboard displayed on display section 130 as shown in FIG. 6.

As shown in FIG. 7, finger 200 touches the display region of the "T" key on the software keyboard displayed on display section 130.

Figure 8:
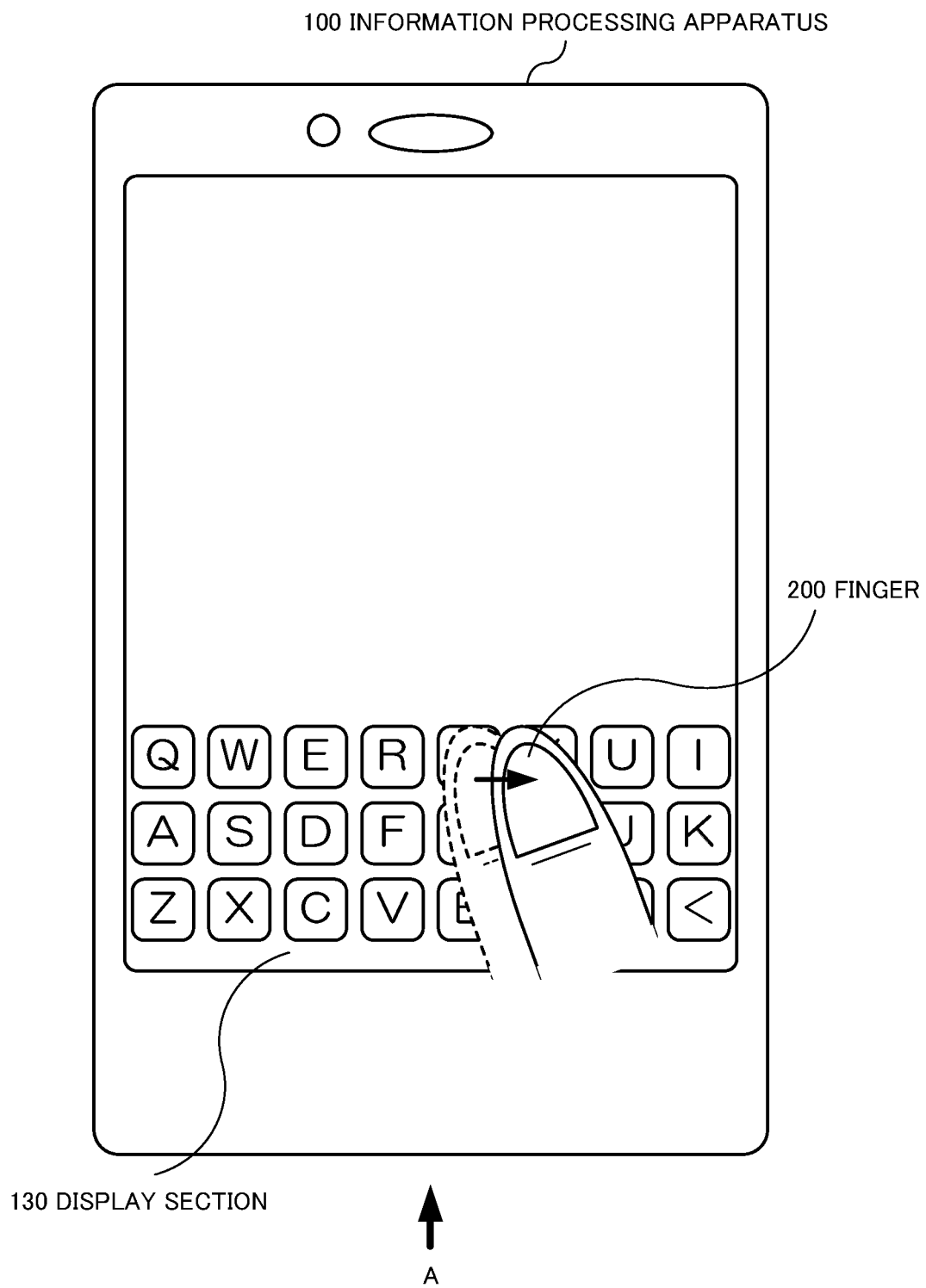
FIG. 8
A diagram showing one example of a state in which when an attempt is made to release the finger from the display region of the "T" key shown in FIG. 7, the finger touches a display region of the "Y" key.

FIG. 8 is a diagram showing one example of a state in which, when an attempt is made to release finger 200 from the display region of "T" shown in FIG. 7, finger 200 touches a display region of "Y".

As shown in FIG. 8, when an attempt is made to release finger 200 that is touching the display region of "T" from display section 130, finger 200 slides in the direction of the display region of "Y", with the result in that finger 200 also touches the display region of "Y".

Figure 9:
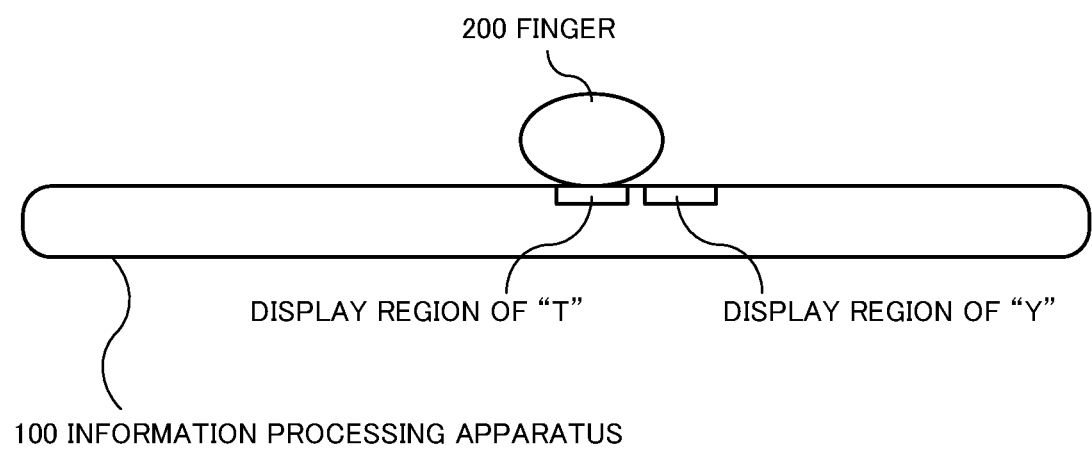
FIG. 9
A diagram showing the state of a touch as viewed from direction A shown in FIG. 7.

FIG. 9 is a diagram showing the state of a touch as viewed from direction A shown in FIG. 7.

Figure 10:
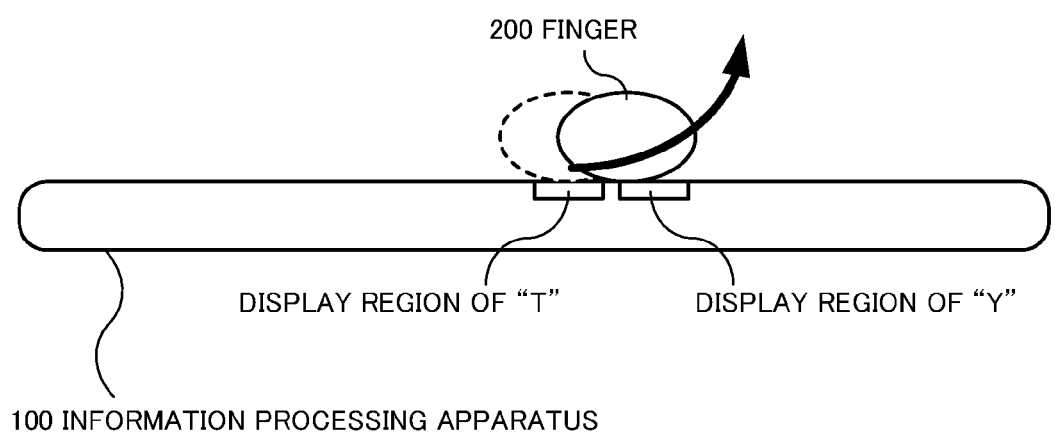
FIG. 10
A diagram showing the state of a touch as viewed from direction A shown in FIG. 8.

FIG. 10 is a diagram showing the state of a touch as viewed from direction A shown in FIG. 8.

When an attempt is made to release finger 200 from display section 130 as shown in FIG. 10 from a state in which finger 200 touches the display region of the "T" key of the software keyboard displayed on display section 130 as shown in FIG. 9, finger 200 slides in the direction of the display region of "Y", with the result that finger 200 touches the display region of "Y". In this case, not only the touch on "T" but also the touch on "Y" are detected, and thus the input is not intended by the user. Such unintended input can be prevented by applying the present invention.

As described above, the present invention can prevent false detection when the finger is released. This is because the detected result is ignored for a specified period of time after the same position has been touched for a specified period of time.

Note that the above described information processing apparatus 100 is an electronic device such as a mobile phone, a mobile terminal, a tablet or note PC (Personal Computer), a smartphone, a PDA (Personal Digital Assistants), and a game console.

The present invention can be applied not only to the software keyboard but also any user interface that continuously specifies a plurality of regions. In addition, even non-portable equipment may be used as long as the equipment includes a touch panel or the like.

The above described process to be performed by each component provided in information processing apparatus 100 may be performed by a logic circuit manufactured for each purpose. Further, the process may be performed such that a computer program (hereinafter referred to as a program) in which the processing content is written as a procedure is recorded in a recording medium readable by information processing apparatus 100, and then the program recorded in the recording medium is read into information processing apparatus 100 for execution. Examples of the recording medium readable by information processing apparatus 100 include not only a movable recording medium such as a floppy (registered trademark) disk, a magneto-optical disk, a DVD, and a CD but also memory such as a ROM and a RAM built into information processing apparatus 100 as well as an HDD. The program recorded in the recording medium is read by control section 120 provided in information processing apparatus 100 and the same process as that described above is performed under the control of control section 120. Here, control section 120 operates as a computer that executes the program read from the recording medium in which the program has been recorded.

Hereinbefore, the present invention has been described with reference to exemplary embodiments, but the present invention is not limited to the exemplary embodiments. Various modifications readily apparent to a person of ordinary skill in the art can be made to the configuration and the detail of the present invention within the scope of the present invention.

This application is based upon and claims the benefit of priority from Japanese Patent Application No. 2012-29441 filed on Feb. 14, 2012, the entire contents of which are incorporated herein by reference.

The invention claimed is:

1. An information processing apparatus comprising:
a detection section that detects a touch; and
a control section that performs control based on the touch detected by said detection section,
wherein when the detection section detects the touch at a detected touch position, a timer measures a period of time during which the detected touch does not move from the detected touch position,
wherein, when the measured period of time is more than a calculated time period, the control section executes a result detected by said detection section,
wherein, when the measured period of time is less than the calculated time period, the control section ignores the result detected by said detection section,
wherein, the calculated time period is updated based on the measured period of time during which the detected touch does not move from the detected touch position where:
"t" denotes the measured period of time during which the detected touch does not move from the detected touch position,
"a" denotes a coefficient,
"T" denotes a constant,
"x" denotes the calculated time period and,
when 0≤t≤T, x is calculated by Expression 1 below $$x = a\left\{1 - \cos\left(\frac{t}{T} \cdot \frac{\pi}{2}\right)\right\}, \quad \text{(Expression 1)}$$

and
when T<t, x=a×T.

2. The information processing apparatus according to claim 1, comprising
a display section, wherein
said detection section detects a touch on a display surface of said display section.

3. An information processing method of performing:
a process of detecting a touch;
a process of performing control based on the detected touch at a detected touch position;
a process of measuring a period of time during which the detected touch does not move from the detected touch position; and
a process of ignoring a detected result at the detected touch position when the measured period of time is less than the calculated time period,
wherein, the calculated time period is updated based on the measured period of time during which the detected touch does not move from the detected touch position where:
"t" denotes the measured period of time during which the detected touch does not move from the detected touch position,
"a" denotes a coefficient,
"T" denotes a constant,
"x" denotes the calculated time period and,
when 0≤t≤T, x is calculated by Expression 1 below $$x = a\left\{1 - \cos\left(\frac{t}{T} \cdot \frac{\pi}{2}\right)\right\}, \quad \text{(Expression 1)}$$

when T<t, x=a×T.

4. A non-transitory computer-readable medium storing a program for causing a computer to execute:
a procedure for detecting a touch;
a procedure for performing control based on the detected touch;
a procedure for measuring a period of time during which the detected touch does not move from the detected touch position; and
a procedure for ignoring a detected result at the detected touch position when the measured period of time is less than the calculated time period,
wherein, the calculated time period is updated based on the measured period of time during which the detected touch does not move from the detected touch position where:
"t" denotes the measured period of time during which the detected touch does not move from the detected touch position,
"a" denotes a coefficient,
"T" denotes a constant,
"x" denotes the calculated time period and,
when 0≤t≤T, x is calculated by Expression 1 below $$x = a\left\{1 - \cos\left(\frac{t}{T} \cdot \frac{\pi}{2}\right)\right\}, \quad \text{(Expression 1)}$$

and
when T<t, x=a×T.

* * * * *